United States Patent [19]

Perretta

[11] Patent Number: 5,025,676

[45] Date of Patent: Jun. 25, 1991

[54] SCREW ADJUSTMENT MECHANISM WITH PRE-SET BACKLASH

[75] Inventor: Frank Perretta, Marlboro, N.Y.

[73] Assignee: Perretta Graphics Corporation, Poughkeepsie, N.Y.

[21] Appl. No.: 375,048

[22] Filed: Jul. 3, 1989

[51] Int. Cl.[5] ............ F16H 55/18

[52] U.S. Cl. ............ 74/441; 74/89.15; 74/424.8 R

[58] Field of Search ............ 74/441, 89.15, 424.8 R; 29/446

[56] References Cited

U.S. PATENT DOCUMENTS

| | | | |
|---|---|---|---|
| 3,094,011 | 6/1963 | Bradley | 74/441 |
| 4,131,031 | 12/1978 | Erikson et al. | 74/441 |
| 4,586,394 | 5/1986 | Perkins | 74/89.15 |

OTHER PUBLICATIONS

Bower; "How to Provide for Backlash in Threaded Parts"; Mechanisms, Linkages, and Mechanical Controls; 1965; pp. 188–189.

*Primary Examiner*—Allan D. Herrmann
*Assistant Examiner*—Scott Anchell
*Attorney, Agent, or Firm*—Joseph L. Spiegel; Joseph B. Taphorn

[57] ABSTRACT

A screw adjustment mechanism with pre-set backlash for an ink fountain blade, includes the adjusting screw threadedly mounting two bushings separated by a compression spring which biases the threads of the respective bushings into engagement with opposite sides of the screw thread a desired amount. The biased bushings are each fixed to the fountain blade. The bushings' thread contact with opposite sides of the screw thread effectively eliminates backlash (lost motion), but the contact can be adjusted to provide a desired resistance to screw adjustment.

7 Claims, 1 Drawing Sheet

SCREW ADJUSTMENT MECHANISM WITH PRE-SET BACKLASH

BACKGROUND OF THE INVENTION

1. Field of the Invention

This invention relates to screw adjustment mechanisms for ink fountain blades and the like, and more particularly to a screw adjustment mechanism wherein the amount of looseness (thread backlash) between two threadedly mated parts can be easily adjusted to a desired minimum.

2. Description of the Prior Art

Threaded shafts (screws) are much used to change the positional relationship between two or more parts. Normally one of such parts is longitudinally movable but held against rotation about a mating screw, and hence is displaced axially of the screw and moved with respect to the other part on turning of the screw. Unfortunately, the amount of looseness of fit (thread backlash) that occurs between mating threaded parts is unpredictable, with the result that the adjusted relationship between the two parts can not be made as precise as is desirable without resort to expensive components.

But even expensive components are not a complete answer to the problem. Wear and tear resulting from use of the screw adjustment mechanism eventually results in a looseness of fit which makes precise adjustment of the part impossible. The problem becomes acute when different metals are in contact, and particularly so when one of the metals is a soft one like aluminum of which ink fountain blades are frequently made.

Existing technology includes many ways of adjusting for thread backlash where the threaded components act as an "in and out" adjustment of a mechanism. All methods employed to date require an assembly procedure which either requires extreme accuracy of the mating parts, or a calibrating adjustment to be made after final assembly of the constituent parts. All existing methods of accomplishing the desired results are either too expensive or difficult to adjust to allow their use in a predictable manner when many such assemblies are required. With the increased use of computer control of adjusting mechanisms, the need for reliable, inexpensive means of achieving improved fit in threaded mechanisms is rapidly exceeding the practicality of the means of achieving it.

Particular prior art includes U.S. Pat. Nos. 4,000,695; 4,655,133; 1,275,348; 2,583,640; 4,534,290; 4,581,994; 3,559,573; 3,730,090; and 4,058,058. U.S. Pat. No. 4,000,695 (Perretta) shows an ink fountain blade assembly wherein a screw 16 is used to adjust the matingly-threaded ink fountain blade 13 with respect to the assembly frame. U.S. Pat. No. 4,655,133 (O'Dea et al) shows the use of a spring 34 about a screw 36 to compensate yieldably for backlash. Showing similar arrangements are U.S. Pat. No. 1,275,348 (Wood); U.S. Pat. No. 2,583,640 (Faeber); U.S. Pat. No. 4,534,290 (Schroder et al); and U.S. Pat. No. 4,581,994 (Wildman). U.S. Pat. No. 3,559,573 (Hantscho) shows a differentially threaded screw 26 matingly engaging two threaded parts 20 and 22, but no backlash adjustment mechanism. U.S. Pat. No. 3,730,090 (Lamberg) also shows a differential thread assembly, but no backlash adjustment mechanism. U.S. Pat. No. 4,058,058 (Hantscho) shows use of a set screw 56 to hold a screw 41 in place with respect to its mating member, and use of a set screw 52 extending into a recess 54 to limit longitudinal movement of a blade 37.

SUMMARY OF THE INVENTION

A main object of the invention is to provide a screw adjusting mechanism for ink fountain blade assemblies and the like, wherein the backlash between parts threadedly mated, can be adjustably limited.

Another object of the invention is to provide such a screw adjustment mechanism that allows easy adjustment of the amount of desired backlash prior to final assembly of the mating threaded parts.

Another object of the invention is to provide such a screw adjusting mechanism wherein the constituent parts can be inexpensive to manufacture.

Still another object of the invention is to provide such a screw adjusting mechanism that permits assembly without complicated calibration.

Yet another object of the invention is to provide such a screw adjustment mechanism that allows subsequent readjustment to compensate for wear between the threaded parts.

These objects of the invention are achieved through the use of a spring between two bushings threadedly mated to a screw and locking the bushings to one of two parts to be moved relative to each other on turning of the screw. The spring causes the bushings to be oppositely situated, threadwise, in their relationships to the screw, before they are locked firmly in place with respect to the part to be adjusted and to each other. Lost motion possibilities between the screw and the part to be adjusted are thus reduced if not eliminated.

A feature of the invention is that the tightness of the fit can be increased or decreased by the proper selection of the size or constant of a spring, or by the amount that the spring is tensioned.

BRIEF DESCRIPTION OF THE DRAWINGS

The above objects, advantages and features of the invention will be apparent from a consideration of the following description of an illustrative embodiment of the invention when taken together with the accompanying drawings wherein.

DETAILED DESCRIPTION OF THE INVENTION

Figure 1:
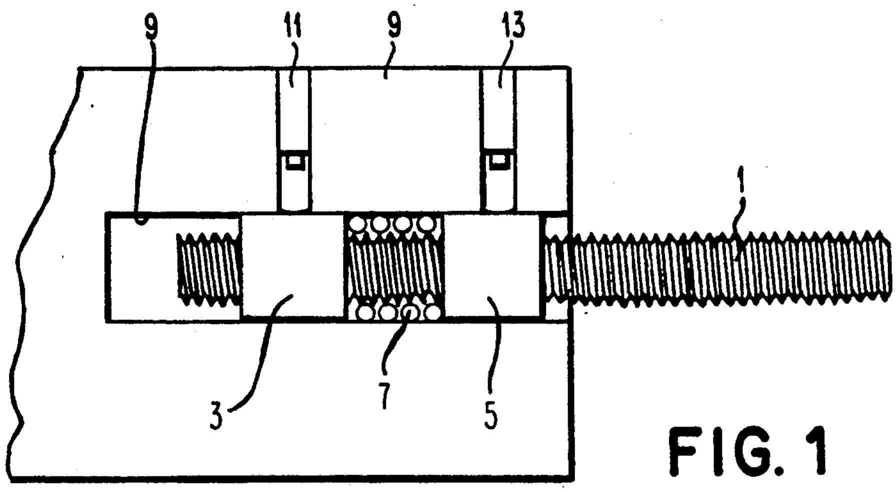
FIG. 1 is a schematic sectional view of a screw adjustment mechanism constructed according to the invention.

Referring now to FIG. 1, a screw adjusting mechanism constructed according to the invention is shown as including a threaded stainless steel shaft 1 fitted with two threaded bronze bushings 3 and 5 respectively. The bushings are separated on the shaft 1 which mounts there between a steel coil spring 7 that is compressed to approximately one-half its free length. The bushings are snugly located in a hole 19 in a longitudinally moveable part 9 which may be an aluminum alloy ink fountain blade. Set screws 11 and 13 threaded in the part 9 engage the bushings 3 and 5 respectively to hold the bushings against movement with respect to part 9.

Figure 2:
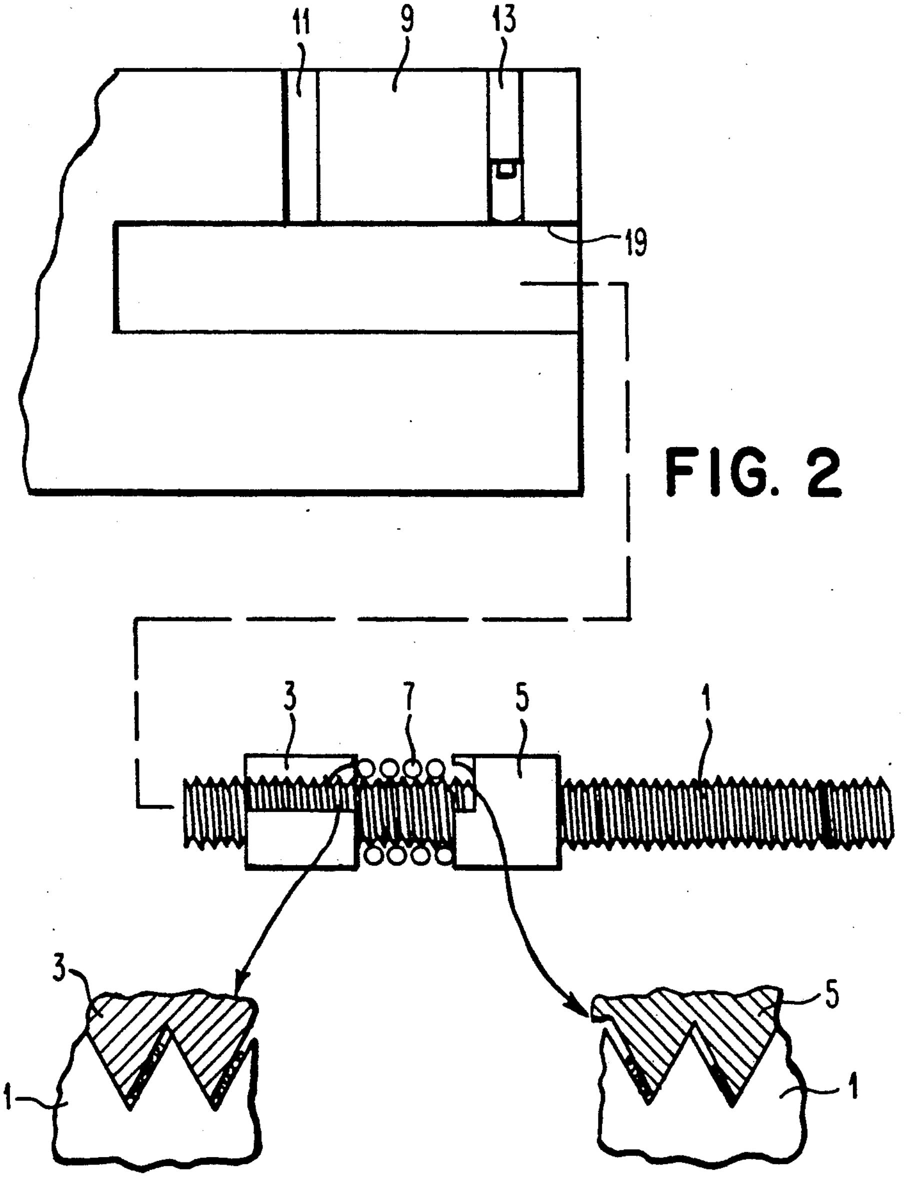
FIG. 2 is a pre-assembly, partly exploded view of the mechanism of FIG. 1.

The screw adjusting mechanism of FIG. 1 would be adjusted for backlash prior to final assembly. Assembly may be begun by first screwing bushing 5 on one end of the stainless steel shaft 1, then placing the coil spring 7 on the shaft, and then threading on the shaft the bushing 3. The bushing 3 will be screwed on shaft 1 to compress a desired amount the coil spring 7 between it and the other bushing 5. Compression of the coil spring 7 causes it to exert axial forces on the bushings which results in the right side (FIG. 2) of the thread of bushings 5 resting against the left side of the thread of the stainless steel shaft 1 at point 17. It also results in the left side of the thread of bushing 3 resting against the right side of the thread of the stainless steel shaft 1 at point 15. It will be evident that any looseness between either of the bushings and the shaft is now caused by the coil spring 7 to be taken in yielding engagement. It will also be evident that this yielding engagement is opposite for the two bushings. It will be evident too that axial forces urged by the compression spring and hence the forces acting between the bushing and the shaft threads can be varied by choosing springs of different sizes and constants, and by varying the location of the bushings with respect to each other on the shaft.

Assembly of the screw adjustment mechanism is completed by inserting the end of the steel shaft 1 with its bushings and coil spring fitted in place into the opening 19 formed in the longitudinally movable part 9. The shaft is inserted to a depth which permits threaded bushing 3 to fall adjacent set screw 11 and threaded bushing 5 to fall adjacent set screw 13. With the coil spring 7 continuing to keep the bushings 3 and 5 in intimate contact with the shaft 1 at points 15 and 17, the set screws 3 and 5 are tightened to secure bushings 3 and 5 fixedly in place with respect to the longitudinally movable part 9. In fixing the bushings with respect to the part, the looseness of bushings with respect to the shaft 1 is also fixed. Basically, the entity of the part 9 acting through the two bushings 3 and 5 is now in firm engagement with each side of the thread on shaft 1, essentially eliminating any looseness (threaded backlash).

After assembly, the shaft 1 remains free to rotate smoothly with a minimum of backlash relative to the mating part 9. Should it be or become desirable to change the tightness of the fit, adjustment may be made by loosening either of the set screws 11 and 13 and turning the shaft to advance it and the (now) loose bushing towards or away from the still fixed bushing to increase or decrease spring 7 compression and hence the axial forces acting on the threads. The loosened set screw would thereafter be tightened. Of course, both set screws 11 and 13 may be loosened to allow removal of the shaft 1, bushings 3 and 5, and spring 7, to enable external adjustment of the thread backlash.

It should be apparent that applicant has provided for the precise adjustment of backlash between two mating threaded parts used in a control mechanism without requiring constituent parts that are costly of manufacture. Furthermore that assembly can be made without complicated calibration. Moreover, applicant's invention allows subsequent readjustment of the tightness of fit in a simple uncomplicated manner. It should also be observed that the relatively soft aluminum alloy part is effectively isolated from thread contact to effectively neutralize it as a source of looseness of fit.

It will be appreciated that the foregoing is to be considered as illustrative only of the principles of the invention, and that while certain novel features of the invention have been shown and described, various omissions, substitutions and changes in the form and detail of the mechanism illustrated and in their use and operation can be made by those skilled in the art without departing from the spirit of the invention.

What is claimed is:

1. In a mechanism wherein a first part is adapted to be moved towards or away from a second part by the turning of a screw threadedly mating with one of the parts, means interacting between the one part and the screw to limit the amount of backlash in both directions inherent in the looseness of the threaded mating, the interacting means includes two bushings threadedly mated with the screw and each movable with respect to the one part and means for biasing the two bushings axially with respect to each other, and means for securing each of the two bushings to the one part after they have been threadedly mated with the screw.

2. A mechanism according to claim 1, wherein the biasing means is a coil spring.

3. A mechanism according to claim 1, wherein the spring is a coil spring surrounding the screw.

4. A mechanism according to claim 3, wherein the coil spring is held under compression between the two bushings to urge one side of the thread of one bushing into contact with one side of the thread of the screw and the other side of the thread of the other bushing into contact with the other side of the thread of the screw.

5. A mechanism according to claim 1, wherein the bushings are fixed with respect to the one part by being placed in a hole therein and having set screws in the part engaging the bushings to prevent rotation and translation of the bushings.

6. A screw adjustment mechanism with pre-set backlash comprising a first part, a second part to be moved towards and away from the first part and having a hole, a screw for interacting between the parts to move the second part, a first and a second bushing on one end of the screw and threadedly mated thereto, a coil spring on the screw and under compression between the two bushings, the end of screw with the two bushings being snugly located in the hole of the second part, and set screws on the second part fixing the bushings to the second part.

7. A screw adjustment mechanism with pre-set backlash for a part to be adjusted relative to another part, comprising a screw, a first and a second bushing on the screw and threadedly mating therewith and each movable with respect to the part to be adjusted, means biasing the bushings in opposite directions on the screw, and means for thereafter fixing each of the bushings with respect to the part to be adjusted.

* * * * *